United States Patent
Porter et al.

(10) Patent No.: US 12,063,325 B1
(45) Date of Patent: *Aug. 13, 2024

(54) SYSTEMS AND METHODS FOR CONTEXTUAL COMMUNICATION BETWEEN DEVICES

(71) Applicant: MASSACHUSETTS MUTUAL LIFE INSURANCE COMPANY, Springfield, MA (US)

(72) Inventors: Sarah Porter, Springfield, MA (US); Zizhen Wu, Springfield, MA (US); Marcy Daniels, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,586

(22) Filed: Mar. 20, 2023

Related U.S. Application Data

(63) Continuation of application No. 17/010,215, filed on Sep. 2, 2020, now Pat. No. 11,611,653.

(60) Provisional application No. 62/898,936, filed on Sep. 11, 2019.

(51) Int. Cl.
  *H04M 3/42* (2006.01)
  *G06F 9/54* (2006.01)
  *G06N 3/08* (2023.01)
  *G06N 7/01* (2023.01)

(52) U.S. Cl.
  CPC ........ *H04M 3/42161* (2013.01); *G06F 9/542* (2013.01); *G06N 3/08* (2013.01); *G06N 7/01* (2023.01); *H04M 3/42127* (2013.01)

(58) Field of Classification Search
  None
  See application file for complete search history.

(56) References Cited

U.S. PATENT DOCUMENTS

| | | | |
|---|---|---|---|
| 8,448,177 B1 * | 5/2013 | Morlen | G06F 16/2423 718/103 |
| 10,623,567 B1 | 4/2020 | Perdue et al. | |
| 2003/0174831 A1 | 9/2003 | Dezonno et al. | |
| 2013/0179259 A1 * | 7/2013 | Lindauer | G06Q 30/02 705/14.52 |

OTHER PUBLICATIONS

Non-Final Office Action on U.S. Appl. No. 17/010,215 dated Aug. 2, 2022 (13 pages).
US Notice of Allowance on U.S. Appl. No. 17/010,215 dated Nov. 23, 2022 (5 pages).

* cited by examiner

*Primary Examiner* — Quynh H Nguyen
(74) *Attorney, Agent, or Firm* — Foley & Lardner LLP

(57) ABSTRACT

An artificial intelligence (AI) model, using logistic regression and gradient boosting tree, may determine a priority score for a user. The priority score may be associated with a likelihood of redemption of investment funds of the user by the user. Based on the priority score for the user, a server may prioritize transmission of a communication message to the user via one of a plurality of communication channels. The communication message may describe why the user should continue with their investment funds without redemption.

20 Claims, 3 Drawing Sheets

SYSTEMS AND METHODS FOR CONTEXTUAL COMMUNICATION BETWEEN DEVICES

CROSS REFERENCE TO RELATED APPLICATIONS

This application is a continuation application U.S. patent application Ser. No. 17/010,215, filed Sep. 2, 2020, which claims priority to U.S. Provisional Application Ser. No. 62/898,936, filed Sep. 11, 2019, each of which is incorporated herein by reference in its entirety.

TECHNICAL FIELD

This application relates generally to computer-based communication systems, which enable contextual communication between analyst computers and user computers via one of a plurality of communication channels.

BACKGROUND

As the processing power of computers allow for greater computer functionality and the Internet technology era allows for interconnectivity between computing systems, many users utilize software applications provided by entities to submit requests, receive recommendations, and communicate with employees. For instance, many users find it more convenient to navigate through a website hosted by an entity than to contact a call center of the entity. Many users may use these electronic tools to submit electronic requests corresponding to instructions to perform various account actions (e.g., change of address or change an account setting).

However, providing services via computer-based or online-based tools and software applications suffers from technical shortcomings. For instance, navigating certain software applications in order to submit an electronic request may be complicated, time-consuming, and confusing. Users with fewer computer skills may have to navigate through many graphical user interfaces (e.g., web pages) to submit an electronic request. This has created a negative user experience because it shifts the burden onto the end user, which is highly undesirable.

SUMMARY

For the aforementioned reasons, there is a need to improve the user experience by predicting users' needs and preemptively contacting users before they submit their electronic requests. There is also a need to establish an electronic communication session between an employee and the user with little to no human intervention.

In a non-limiting example, a user may use a computer-based tool associated with an entity to submit an electronic request (e.g., submit inputs and receive recommendations for one or more investment products, such as mutual funds). For example, the user may submit the electronic request to purchase mutual funds. The user may have an option of redeeming the mutual funds at any time, which may provide a great amount of flexibility to the user. Typically, if the mutual funds are yielding a lower return, the user may immediately sell the mutual funds by submitting another electronic request via the computer application of the entity. However, it would be desirable to contact the user before the submission of the request for redemption.

What is therefore needed, in the above-described example, is a computer-based communication system, which is configured to determine a priority score for each user and a fund associated with each user, prior to the user initiating a redemption process of the fund. Based on the priority score for each user, servers of the computer-based communication system may prioritize transmission of a communication message to each user via one of a plurality of communication channels. Therefore, what is needed to preemptively contact the user (via the most effective communication channel) before the user submits an electronic request.

In one non-limiting example method of operation of the computer-based communication system, when there is a high probability that the users are going to redeem (i.e., cash out) their respective funds, then the users having a highest priority may be communicated via a first communication channel (for example, a phone call), and the users having a next highest priority may be communicated via a second communication channel (for example, an automated email) explaining why the users should continue with their respective funds without redemption. The communication with the users at a right time may lead to retention of a high percentage of the users (at least between 2% and 11%) and their respective funds (at least 37%), which may result in an estimated cost savings of millions of dollars.

In one embodiment, a computer-implemented method comprises executing, by a computer, an artificial intelligence model configured to identify a likelihood that a user will redeem an asset within a time period at an amount higher than a previous time period; generating, by the computer, a priority score corresponding to the likelihood that the user will redeem the asset; when the priority score satisfies a threshold value, initiating, by the computer, an outgoing call to a user; and when the priority score does not satisfy the threshold value, transmitting, by the computer, an electronic message to a user computer.

In another embodiment, a system comprises a server comprising instructions stored on a non-transitory computer-readable medium that when executed by a processor: execute an artificial intelligence model configured to identify a likelihood that a user will redeem an asset within a time period at an amount higher than a previous time period; generate a priority score corresponding to the likelihood that the user will redeem the asset; when the priority score satisfies a threshold value, initiate an outgoing call to a user; and when the priority score does not satisfy the threshold value, transmit an electronic message to a user computer.

It is to be understood that both the foregoing general description and the following detailed description are explanatory, and are intended to provide further explanation of the subject matter as claimed.

BRIEF DESCRIPTION OF THE DRAWINGS

The accompanying drawings constitute a part of this specification and illustrate an embodiment of the subject matter and together with the specification, explain the subject matter.

DETAILED DESCRIPTION

Figure 1:
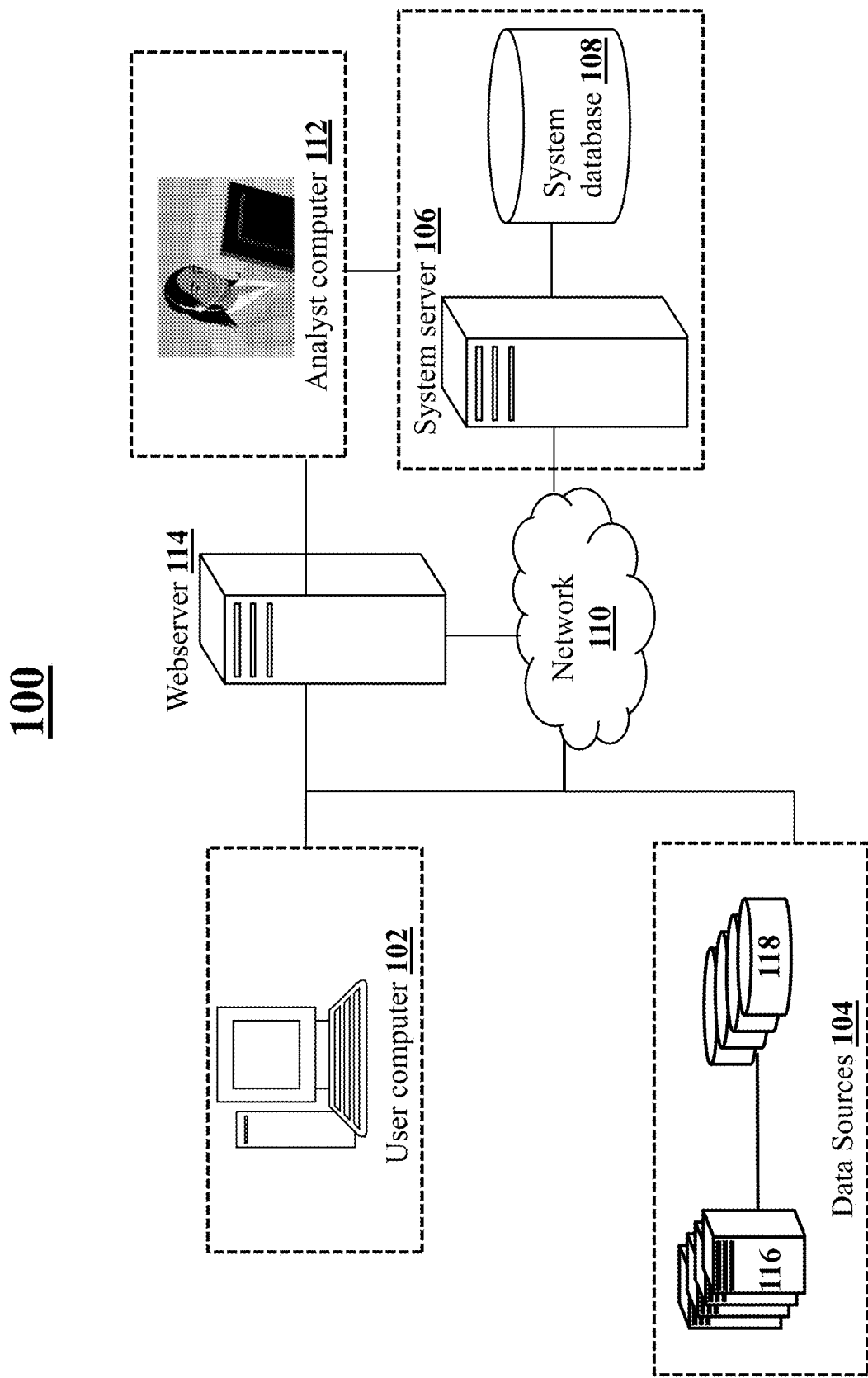
FIG. 1 shows components of a computer-based communication system, according to an embodiment.

An artificial intelligence system determines a likelihood that a user will redeem an asset and performs a communication action based on the likelihood and other factors. The communication system is configured to determine a priority score for each user and a fund associated with each user prior to the user initiating a redemption process of the fund. Based on the priority score for each user, servers of the computer-based communication system may prioritize transmission of a communication message to each user via one of a plurality of communication channels. When there is a high probability that the users are going to redeem (i.e., cash out) their respective funds, then the users having a highest priority may be communicated via a first communication channel (for example, a phone call), and the users having a next highest priority may be communicated via a second communication channel (for example, an automated email) explaining why the users should continue with their respective funds without redemption.

A computer-based communication system may include a system server and data sources. The system server may collect data from various data sources. The data sources may include advisor datasets, asset datasets, Morningstar datasets, transaction datasets, predictive models, and mapping tables. The data may include information associated with assets, prior redemptions, sales, fund performance, and other advisor related information. The system server may process the data to parse, normalize, clean, and assemble the data. The system server may store processed data in a system database. The system server may analyze the processed data in search of patterns, which are associated with potential redeeming assets. The system server may evaluate the patterns using a variety of techniques. The techniques may include linear models techniques as well as non-linear model techniques, at various levels of time resolution and entity type (advisors, funds, shareholders).

The system server may generate an artificial intelligence (AI) model, which may be used to analyze various redemption activities at an advisor, a user, or a fund level. The system server may collect the data from the data sources for fund transactions at the user level or the advisor level. The system server may use the data to train the AI model. The system server may continuously retrain and update the AI model with new data. The training of the AI model may include randomized experiments using the data. The system server may perform one or more randomized experiments to measure an effect of a specific intervention on a redemption rate of the users. The system server may generate a training dataset for each randomized experiment, such that, a sufficiently large number of the users are selected according to a pre-defined sampling strategy, and then randomly assigned to either a treatment group or a control group. Based on the randomized experiments, the system server may detect a time-period for appropriate interventions and communications with the users, which may reduce redemption rates of the users.

The AI model may be a combination of weighted linear regression, gradient boosting regression, and gradient boosting classification, to improve prediction accuracy for redemption rate of the users. The AI model may determine results, which may be adjusted by a gradient boosting classification model. The gradient boosting classification model may use same or similar indicators to determine whether or not there is a likelihood of the redemption by the users in a following predetermined period of time. The AI model may be computationally efficient, which may significantly improve the prediction accuracy by 10%~20% at fund level and at firm level.

The AI model may be operable to predict a user or a fund associated the user, which may have a high redemption rate in a following predetermined period of time. The system server may execute the AI model to determine a priority score associated with the user. The system server may assign a mode of communication channel to the user based on the priority score associated with the user. The system server may further assign an appropriate analyst to the user based on the priority score associated with the user, the mode of communication channel assigned to the user, profile information associated with the user, and profile information associated with the analyst. The profile information associated with the user may include a list of all assets associated with the user, prior redemption activities of the user, etc. The profile information associated with the analyst may include a list of prior successful redemption stoppages and sales experience.

In one non-limiting example method of operation of the computer-based communication system, for a first set of users having a high priority score, the system server may assign a first set of analysts for the first set of users. The first set of analysts may have video conference with the first set of users, which may be a most expensive method of communication between the analysts and the users. For a second set of users having an average priority score, the system server may assign a second set of analysts for the second set of users. The second set of analysts may communicate with the second set of users via an audio call, which may be a less expensive method of communication between the analysts and the users than the video conference. For a third set of users having a low priority score, the system server may assign a third set of analysts for the third set of users. The third set of analysts may communicate with the third set of users via an electronic mail, which may be a low-cost method of communication between the analysts and the users.

The AI model employed in the computer-based communication system may be particularly useful in user retention applications where the complexity and the volume of the data make manual user-redemption monitoring impractical, inefficient, and time-consuming. When evaluating user activity, time is a very important factor because a user may redeem on its investment funds prior the system server communicating with the users on their respective user computers.

The present disclosure is here described in detail with reference to embodiments in the drawings, which form a part here. Other embodiments may be used and/or other changes may be made without departing from the spirit or scope of the present disclosure. The illustrative embodiments described in the detailed description are not meant to be limiting of the subject matter presented here. Reference will now be made to the embodiments illustrated in the drawings, and specific language will be used here to describe the same. It will nevertheless be understood that no limitation of the scope of the subject matter is thereby intended. Alterations and further modifications of the inventive features illustrated here, and additional applications of the principles of the subject matter as illustrated here, which would occur to one skilled in the art and having possession of this disclosure, are to be considered within the scope of the subject matter.

FIG. 1 shows components of a computer-based communication system 100. The computer-based communication system 100 may include user computers 102, data sources 104, system servers 106, system databases 108, analyst computers 112, and webservers 114. The data sources 104 may include data generation devices 116 and data repositories 118.

The user computers 102, the data sources 104, the system servers 106, the system databases 108, the analyst computers 112, and the webservers 114 communicate with each other over a network 110. The network 110 may include, but is not limited to, private or public local area network, wireless local area network, metropolitan area network, wide-area network, and the Internet. The network 110 may further include both wired and wireless communications according to one or more standards via one or more transport mediums. The communication over the network 110 may be performed in accordance with various communication protocols such as transmission control protocol and internet protocol, user datagram protocol, and institute of electrical and electronics engineers communication protocols. The network 110 may further include wireless communications according to Bluetooth specification sets, or another standard or proprietary wireless communication protocol. The network 110 may further include communications over a cellular network, including, for example, a global system for mobile communications, code division multiple access, and enhanced data for global evolution network.

The computer-based communication system 100 is described in a context of computer-executable instructions, such as program modules, being executed by a server computer, such as, the system server 106. The program modules may include programs, objects, components, data structures, etc. that perform particular tasks or implement particular abstract data types. The features of the computer-based communication system 100 may be practiced either in a computing device, or in a distributed computing environment, where the tasks are performed by processing devices, which are linked through a communications network 110. In a distributed computing environment, program modules may be located in both local and remote computer storage media including memory storage devices.

In operation, the system server 106 may execute an AI model to infer whether there is any probability that the users of the user computers 102 are going to redeem (i.e., cash out) on their investment funds. Initially, the system server 106 may execute the AI model using various inputs associated with each user to determine a priority score for each user. The inputs may include user information and investment information of each user. The priority score may correspond to a likelihood of each user redeeming their investment funds. The system server 106 may update user records associated with each user to include their priority score. The system server 106 may update the user records according to one or more pre-stored instructions. The system server 106 may store updated user records in the system database 108.

The system server 106 may prioritize communication with each user based on their corresponding priority score. Initially, the system server 106 may assign a mode of communication channel to each user based on their priority score. Then, the system server 106 may assign an appropriate analyst to each user based on their priority score, the mode of communication channel, profile information of the user, and profile information of the analyst.

The system server 106 may provide a first subset of users having a highest priority a phone call on their respective user computers 102 from a first subset of analyst computers 112 to discuss about their investment, and pursue the first subset of users for not redeeming on their investment funds. Each analyst may operate one of the first subset of analyst computers 112, and may communicate with one of the first subset of users via the phone call. Each analyst may be specialized to work on investment products associated with the user. A second subset of users having a next highest priority may get an automated electronic message on an interactive graphical user interface of their respective user computers 102 from a second subset of analyst computers 112. Each analyst may operate one of the second subset of analyst computers 112, and may communicate with one of the second subset of users via the phone call. The electronic message may explain why the second subset of users should continue with their investment funds without redemption. The electronic message may include a recommendation for updating existing investment funds and/or purchasing new investment funds. The recommendation may include specific information of a new commodity or an item of value to purchase, such as, securities, equities, bonds, futures, mutual funds, derivatives, currencies, hedge funds, real estate investment trusts, etc.

Each user operating the user computer 102 may accept or reject the recommendation, and decide on whether to continue with current investments funds, or invest in a particular fund. The user operating the user computer 102 may select a new investment fund recommendation displayed on the interactive graphical user interface. The system server 106 may then take the user from a recommendation plan into a necessary product fulfillment software application, through use of one or more web links, where the user may execute necessary steps in order to purchase the new investment fund.

Data sources 104 may include multiple computing devices and databases. Each data source 104 may include a data generation device 116 and a data repository 118. Each data generation device 116 may be a server computing device, which may generate data records according to a data model. Each data repository 118 may store the data records, generated by at least one data generation device 116, according to a number of data formats (e.g., XML, JSON, RSS, SQL, text file, RSS). The data generation device 116 may transmit the data records to the system server 106 over a number of internal and external data networks 110. The system server 106 may fetch the data records from the data repository 118 based on a triggering circumstance (e.g., time-based periodic updates, real-time updates).

The data records may include, but not limited to, assets data, advisor data, flow data, fund performance data, risk data, among various other types of data records. Various assets may include, but not limited to, securities, equities, bonds, futures, mutual funds, derivatives, currencies, commodities, insurance contracts, mortgages, investment contracts, hedge funds, high-yield debt, foreign debt, convertible debt, notes, real estate investment trusts, etc. The assets data associated with the assets may include, but not limited to, effective date, hoc ids, fund number, composite fund number, business segment, monthly assets, redemptions, and sales recorded in a one or more business days of each week.

The advisor data may include, but not limited to, information associated with advisors. The advisors may be investment advisors. The advisors may be uniquely identified by hoc ids, such as, hoc firm number, hoc branch number, and hoc rep ae number. Each advisor may have multiple records in each month. In the data aggregation process, monthly assets of each advisor may be the sum of assets in that week. Since the transaction records, such as, redemptions and sales are not accurate, the transaction records may not be used for data analysis and predictive modeling. The advisor data may further include, but not limited to, hoc ids for brokerage firm, branch of the firm, representative of the firm, distribution channel code, and channel description for each advisor.

The flow data may include, but not limited to, postdate, hoc firm number, hoc branch number, hoc rep ae number, business segment, daily redemptions, and sales information for each advisor. The advisors may not be included in the daily flow data if the advisors do not have transaction in that day. The funds and the advisors may be uniquely identified by five-digit fund code and hoc ids, respectively. In total, there are approximately 100 million transaction records in the flow data.

The fund performance data may include, but not limited to, information associated with various funds. A server of Morningstar, which is an investment research firm, may generate monthly fund performance data on a last day of every month. The fund performance data may include, but not limited to, fund code, date for Morningstar data, Morningstar ratings for each fund, and various fund performance variables, such as, average annual return, primary benchmark rate of return, etc. The fund performance data may be used to predict fund redemption rate and identify which funds may be at risk.

The risk data may include, but not limited to, information associated with various risks. A server may generate the risk data each month. The risk data may be used for model comparison. The server may provide scored files monthly. The risk data may include, but not limited to, time id, fund code, firm, channel, redemption data, predicted redemption data, and assets information from previous month.

A system server 106 is a computing device, which may include a processor and a non-transitory machine-readable storage media. The non-transitory machine-readable storage media may store software modules, which may instruct the processor to execute various processes and tasks described herein. Non-limiting examples of the system server 106 may include, but not limited to, a workstation computer, a server computer, a laptop, and a tablet device. For ease of explanation, FIG. 1 shows a single computing device functioning as the system server 106. However, it should be appreciated that some embodiments may include multiple system servers 106 capable of performing the various tasks described herein.

The system server 106 may be coupled to the data sources 104 via the one or more networks 110. The system server 106 may be in communication with the system database 108 via the one or more networks 110. The system server 106 may be in communication with the analyst computer 112 via the webserver 114. The system server 106 may be in communication with the user computer 102 via the webserver 114.

The system server 106 may receive the data records from the data sources 104. The data records may be log files or machine-readable codes containing various data fields associated with assets data, advisor data, flow data, fund performance data, risk data, among various other types of data records. The system server 106 may process and reconstruct the data records into a standardized data model format of the computer-based communication system 100. The system server 106 may store standardized data records in the system database 108.

The system server 106 may retrieve the data records from the data sources 104. The system server 106 may clean, normalize, and format the data records. For example, during cleaning and formatting process, the system server 106 may remove transaction records with missing hoc ids in the assets data and the flow data. The system server 106 may aggregate formatted data records. For example, the system server 106 may aggregate the formatted data records associated with the assets data and the flow data to calculate monthly redemptions and sales for each advisor. The system server 106 may combine the formatted data records associated with the assets data, the flow data, the advisor data, the fund performance data, etc. by hoc ids, fund, year, and month. The system server 106 may aggregate the formatted records by at least one attribute, such as, a name of a firm, a name of a data channel, fund, and year. The system server 106 may compute a sum of assets, redemptions, and sales within a predetermined period of time. The system server 106 may store aggregated data records in the system database 108.

The system server 106 may execute one or more algorithms on all or portion of the data records to process the data records. The algorithms may be computer files stored on the system database 108. The system server 106 may then identify data field entries in the data records, which are incomplete, missing, or not required. The system server 106 may remove rows of the data records with missing assets, redemptions, or sales. The system server 106 may record redemptions and sales within the data records, as negative and positive numbers, respectively. The system server 106 may remove data points with positive redemptions or negative sales from the data records. The system server 106 may remove rows of the data records with redemptions greater than assets from the previous month or during any predetermined period of time. The redemption rate may be a percentage of the assets from previous month being redeemed in a given period of time (for instance, three months). The system server 106 may store the processed data records in the system database 108.

The system server 106 may generate the AI model. The AI model may predict a redemption rate for each fund owned by the user operating the user computer 102. The AI model may identify which fund may be at risk within a predetermined period of time. The AI model may predict the redemption rate for each fund, and identify which fund may be at risk within the predetermined period of time. The system server 106 may train the AI model using the data records, such as, specifications of existing data records received from data sources 104. The system server 106 may train the AI model using known fund redemption indicators acquired from the data records. The system server 106 may continuously re-train the AI model using any new supply of the data records received from data sources 104.

The AI model may include a neural network. The neural network may include an interconnected group of artificial neurons where each neuron may represent a redemption-related attribute. Each neuron may represent one attribute associated with the user. Non-limiting examples of the attributes may include, but not limited to, a past financial history of the user operating the user computer 102, assets information of the user, current market value of the assets of the user, a number of transactions per month by the user, an amount of transactions of the user, and the like. The AI model may represent a computational model, which may include mathematical functions describing the relationship between each neuron within the neural network using weight and bias factors. The AI model may include, but not limited to, a mathematical function describing how the neurons are divided into one or more layers.

As the system server 106 encounters new data records, the system server 106 may re-train the AI model to learn new redemption related user behavior and attributes acquired from the new data records. The AI model may then reconfigure itself to adapt to the new redemption related user behavior and attributes, which may lead to a more accurate identification of the potential redemption indicators and activities associated with the user. In operation, when the system server 106 may identify the new data records in the data sources 104, the system server 106 may process and use the new data records to re-train the AI model. As a result, the AI model may use a back-propagation method to reconfigure the mathematical functions (e.g., weight and bias factors), and revise itself to account for the new data records. Accordingly, the AI model is never complete, and may be iteratively trained each time the new data records are identified. The system server 106 may use a variety of methods to train and re-train the AI model, such as, evolutionary algorithm methods, simulated annealing methods, expectation-maximization methods, and non-parametric methods.

The system server 106 may train and re-train the AI model based on known false positive retention identification. For example, when the AI model may determine that a particular user has redeemed on its investment funds, the system server 106 may transmit a notification to an administrator computer, which may verify whether the user has indeed redeemed on its investment funds. Upon receiving a notification from the administrator that the AI model yielded incorrect results about the particular user, the system server 106 may then re-train the AI model to avoid future false positives.

The system server 106 may create the neural network, which may include multiple attributes associated with known activities of the users (e.g., the users who have redeemed on their investment funds). The system server 106 may create the initial AI model based on the known activities of the users. The system server 106 may execute the initial AI model using a new set of data records, which may represent new activities of a new user to identify whether the new user is going to redeem on its investment funds. However, because the new users may have an attribute not previously considered by the AI model, the result of the execution may not be accurate. Therefore, the initial AI model may have to be re-trained using other known attributes to achieve the optimum accuracy. With each iteration of training, the AI model may improve because the AI model may consider the new attributes, which were not previously considered (e.g., previously not included within the neural network).

The system server 106 may generate the AI model, using logistic regression and gradient boosting tree. The AI model may include one or more statistical models, such as, weighted least square regression model, gradient boosting regression model, and gradient boosting classification model.

The weighted least square regression model may utilize each data point having equally precise information. A residual variance may be constant over all values of predictor features. In the data records associated with various investment funds, the system server 106 may not be reasonable to assume that every observation should be treated equally. This is because prior data analysis may show that large investment funds may have a smaller variation in a predetermined time period for a redemption rate, such as, during a three-month redemption rate. Accordingly, the system server 106 may treat the investment funds from a previous month as weights in the weighted least square regression model. The data points with large investment funds may have large weight. The weighted least square regression model may allow for making different types of easily interpretable effect estimations and predictions.

The gradient boosting regression model may be a machine learning model. Based on a decision tree, the system server 106 may add new models to the ensemble sequentially. During each iteration, the system server 106 may train a new decision tree with respect to an error rate of whole ensemble from previous steps. In the gradient boosting regression model, the system server 106 may use same predictors, which may be used to predict redemption rate. The system server 106 may optimize the AI model performance by tuning different parameters, such as, a depth of tree, a learning rate, and a number of trees.

The system server 106 may execute the AI model, using one or more inputs, to determine a priority score for each user. The priority score may correspond to a probability that the user may redeem their investment funds within a predetermined period of time. The system server 106 may determine a communication channel for each user based on the priority score associated with each user. The system server 106 may determine an appropriate analyst for each user based on the priority score associated with each user, the communication channel assigned to each user, profile information associated with each user, and profile information associated with each analyst. The profile information associated with each user may include a list of all investment funds associated with the user, prior redemption activities of the user, etc. The profile information associated with each analyst may include a list of prior successful redemption stoppages and sales experience.

The system server 106 may generate a notification corresponding to each user. Each notification may include a request to a particular analyst to establish communication with a particular user operating the user computer 102. Each notification may include information associated with subject matter (e.g., a type of an investment fund of the particular user, which may be redeemed by the user), user profile information associated with the particular user, a name of the particular analyst that may communicate with the particular user, a type of communication channel to connect the analyst computer 112 and the user computer 102, and a procedural role of the respective analyst. The system server 106 may transmit the notifications to the analyst computer 112.

An analyst computer 112 may be a computing device, which may be used by the analyst to communicate with the user of the user computer 102. The computing device may include a processor, and is capable of performing various tasks and processes described herein. Non-limiting examples of the analyst computer 112 may include, but not limited to, laptops, desktops, servers, tablets, and smartphones. While the computer-based communication system 100 may include a single analyst computer 112, in some embodiments, the analyst computer 112 may include a number of computing devices operating in a distributed computing environment.

The analyst computer 112 may receive the notifications from the system server 106. The notifications may be displayed on an interactive graphical user interface of the analyst computer 112. The notifications may include requests to establish communication with each user computer 102 operated by a particular user. Each request may include the information associated with the subject matter of the request, the user profile information associated with the user, the name of the analyst that may communicate with the user, the type of communication channel to connect the analyst computer 112 and the user computer 102, and the procedural role of the respective analyst.

Each request may have a data field identifying a nature of the request, and another data field indicating a time-sensitive nature or a customer-sensitive nature of the request. Based on the data fields, each analyst computer 112 may receive the requests having the data fields associated with analyst credentials of the analyst operating the analyst computer 112. For instance, a first analyst specializing in a first type of investment funds may operate a first analyst computer 112, which may receive the requests having a data field indicating that each particular request is associated with the first type of investment funds.

The notifications and the requests included in the notifications may be stored into dedicated databases or sub-databases of the system database 108, where each sub-database is configured to store certain types of requests. Each analyst computer 112 may be limited to accessing certain sub-databases, according to the analyst credentials of the analyst operating the analyst computer 112. Similarly, the analyst computer 112 may receive the requests and the notification messages, which the analyst computer 112 may present on its interactive graphical user interface. The system server 106 may trigger and transmit the notifications to each analyst computer 112 having analyst credentials with access attributes indicating the role of the analyst. For instance, a second analyst may have the analyst credentials with attributes, which may indicate that the second analyst specializes in handling mutual funds of a company A. When a new notification is generated or an existing notification is updated with a data field indicating that the notification is associated with the mutual funds of the company A, the system server 106 may transmit the notification message to the analyst computer 112 of the second analyst.

The analyst computer 112 may be coupled to a helpdesk software, such as, a queuing system or an interactive voice response system, such that the analyst may use the analyst computer 112 to interact with the user operating the user computer 102, over the phone conversation or the chat service, based on the notification associated with the user. The analyst computer 112 may include the interactive graphical user interface, which may allow the analyst to navigate information associated with each user displayed on the interactive graphical user interface during the phone call or the online chat. The information may include current investment funds of the user, prior investment funds of the user, transaction history of the user, etc. The analyst computer 112 may capture communication records associated with an ongoing call or an online chat with the user computer 102 of the user. The analyst computer 112 may store the communication records in the system database 108.

The analyst computer 112 may execute a software program, which may automatically, or through an input, generate an alert element associated with the user. The alert element may include communication information provided by the analyst based on the communication with the user. For example, the alert element may include a reminder to call the user after a predetermined period of time. The analyst computer 112 may store the alert elements in the system database 108.

A user computer 102 may be operated by the user. The user computer 102 may be a computing device. The computing device may include a processor and a non-transitory machine-readable storage. The non-transitory machine-readable storage may be capable of executing various tasks and processes described herein. Non-limiting examples of the user computer 102 may include, but not limited to, a workstation computer, a laptop computer, and a server computer. While the computer-based communication system 100 may include a single user computer 102, in some embodiments, the user computer 102 may include a number of computing devices operating in a distributed computing environment.

The user computer 102 may allow the user to interact with the system server 106 via the webserver 114. The user computer 102 may execute an Internet browser, which may access the webserver 114. The webserver 114 may issue requests or instructions to the system server 106 to access the investment information associated with the user. The user computer 102 may transmit credentials from user inputs to the webserver 114, from which the webserver 114 may authenticate the user. The user computer 102 may include a number of input devices, which may be configured to receive a number of data inputs for authentication. The data inputs may include username, passwords, certificates, and biometrics.

As an example of the user computer 102 operation, the user computer 102 may execute an Internet browser that accesses the webserver 114 hosting an investment company website. The investment company website may provide the users access to potential investment plans, and managers with space to advertise investments to potential users. The user computer 102 may issue queries or instructions to the system server 106, via the webpages generated by the webserver 114, which may instruct the system server 106 to perform various tasks, such as, retrieving an investment plan from the system database 108. The system server 106 may present the investment plan on the graphical user interface of the user computer 102. Using the user computer 102, the user may select the investment plan. As the transaction proceeds, the user computer 102 may upload machine-readable computer files containing transaction information associated with the investment plan. The computer files may be stored in document records within the system database 108.

A webserver 114 may host an investment company website accessible to users on their user computers 102, where content presented via various webpages may be controlled. The webserver 114 may be a computing device. The computing device may include a processor and a non-transitory machine-readable storage. The non-transitory machine-readable storage may be capable of executing various tasks and processes described herein. Non-limiting examples of the webserver 114 may include, but not limited to, a workstation computer, a laptop computer, and a server computer. While the computer-based communication system 100 may include a single webserver 114, in some embodiments, the webserver 114 may include a number of computing devices operating in a distributed computing environment.

The webserver 114 may execute software applications to host the investment company website, which may generate and serve various webpages to the user computer 102. The investment company website may be used to generate and access data stored on the data sources 104 and/or the system database 108. The webserver 114 may require user authentication based upon a set of user authorization credentials e.g., username, password, and biometric. The webserver 114 may access the system database 108 configured to store user credentials, which the webserver 114 may reference in order to determine whether a set of entered credentials purportedly authenticating the user match an appropriate set of credentials that identify and authenticate the user. The webserver 114 may generate and serve webpages of the investment company website to the user computer 102 based upon a user profile and role within the system database 108, e.g., administrator, advisor, investor, etc. The user role may be defined by data fields in the user records stored in the system database 108, and the webserver 114 may authenticate the user and the user role. The webserver 114 may generate webpage content based on the data stored in the system database 108, according to the user profile.

When the user accesses the computer-based communication system 100, the user most often does so using the user computer 102 that is connected to the network 110. The network 110 is connected to the system server 106. The user commonly accesses the system server 106 through the network 110 (e.g., internet) to access an investment management tool, which is available via a financial institution, via a website hosted by the webserver 114. Once the user accesses a web link to the investment management tool, the system server 106 may inform the user of the information that the user may need, i.e., monthly income, amount of net worth, or details about current investment funds, in order for the system server 106 to formulate a recommendation for the user investment funds. The system server 106 may provide web links to the user on the investment company website hosted by the webserver 114. The web links may define income or net worth, and a risk tolerance bar graph to assist the user in determining their level of investment risk. Once the user begins the process, the system server 106 may take the user through a series of screens, which may be related to, but not limited to, financial information, financial objectives, and investment assets of the user. The user may be presented with a series of questions, e.g., what is the investing goal, taxable income, and whether tax-advantaged or taxable investments are required. Depending upon whether the user is making tax-advantaged or taxable investments, the system server 106 recommendations of investment plans to the user may vary.

A system database 108 may be hosted on a server of the computer-based communication system 100, such as, a system server 106. The system server 106 may be capable of storing data and data records in a plain format and/or or encrypted version. The system database 108 may be in communication with a processor of the system server 106, where the processor is capable of executing various commands of the computer-based communication system 100. The system database 108 may be a part of the system server 106. The system database 108 may be a separate component in communication with the system server 106 and/or other devices of the computer-based communication system 100.

The system database 108 may be in communication with the system server 106 via the network 110. The system database 108 may include a non-transitory machine-readable storage media, which is capable of receiving and storing the data records. The system database 108 may have a logical construct of data files that are stored in a non-transitory machine-readable storage media, such as, a hard disk or memory, controlled by software modules of a database program.

The system database 108 may store the data records describing the users, e.g., user data, such as user credentials (e.g., user name, passwords, biometrics, encryption certificates), user account data, user roles, or user permissions; document records that may comprise machine-readable computer files (e.g., word processing files), parsed portions of the computer files, or metadata associated with computer files; and application data. The application data may include software instructions executed by the system server 106.

Figure 2:
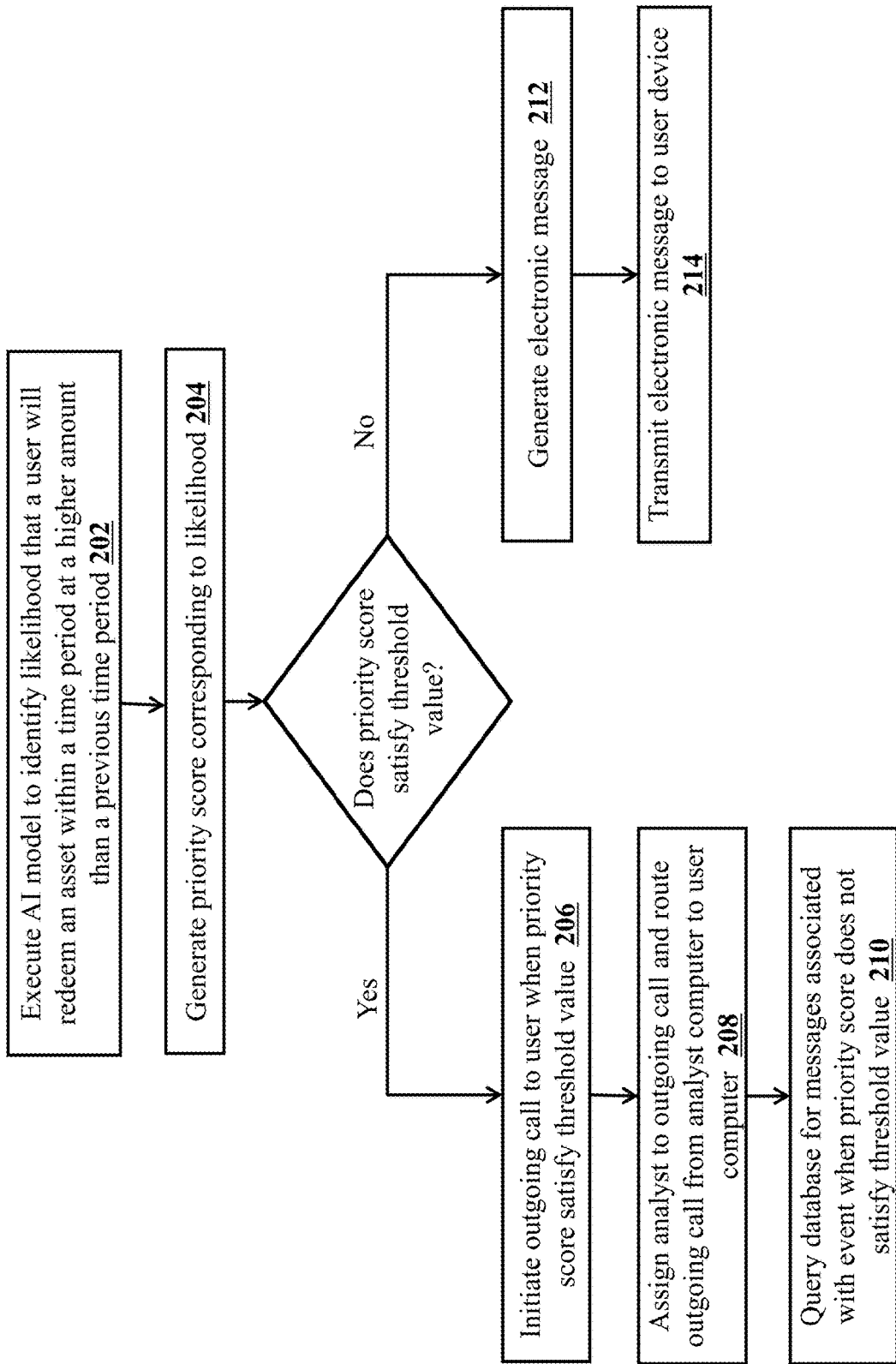
FIG. 2 shows execution of a method for establishing communication between analyst computers and user computers, according to an embodiment.

FIG. 2 shows execution of a method 200 for establishing communication between analyst computers and user computers. The method 200 shown in FIG. 2 comprises execution steps 202, 204, 206, 208, 210, 212, and 214. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of FIG. 2 is described as being executed by a single server computer in this embodiment. However, in some embodiments, steps may be executed by any number of computing devices operating in a distributed computing environment. In some cases, a computer executing one or more steps may be programmed to execute various other, unrelated features, where such computer does not need to be operating strictly as a system server described herein.

In a first step 202, the system server may execute an AI model using input datasets associated with a user. The input datasets may include, but not limited to, information associated with the user, such as, investment funds of the user, transaction history of the user, etc. Upon execution of the AI model, the AI model may identify a likelihood that a user will redeem (e.g., repayment of any money market fixed-income security at or before the asset's maturity date) an asset (e.g., investment fund) within a time period at a higher amount than a previous time period. The identification of the likelihood may be associated with a triggering circumstance. The triggering circumstance may correspond to an action associated with a user's account, such as a balance dropping below a threshold amount. The triggering circumstance may correspond to a tentative time period associated with the redemption of the one or more investment funds. The tentative time period may define a predetermined period of time in which the one or more investment funds may be redeemed by the user. The user may redeem the one or more investment funds because of a low monetary value of the one or more investment funds or any other reason. The system server may store an identified event in a record associated with the user in a system database.

In a next step 204, the system server may query the system database to determine contextual information associated with the likelihood. The system database may store information associated with multiple users and multiple events. The system server may retrieve the contextual information from the system database. The contextual information may include, but not limited to, data regarding previous user responses to similar events (e.g., one or more events similar to the identified event in terms of a type of investment funds). For example, when identifying the likelihood that the user will redeem within the next three months, the contextual information may include the user's redemption actions within a previous three months or twelve months. The system server may store the contextual information associated with the event in the record associated with the user in the system database.

In one non-limiting example, the system server may identify a likelihood of redemption for a first user, e.g., that the first user may redeem a first mutual fund associated with a first company in one month. The system server may query the system database using multiple inputs, such as, information associated with the first user, information associated with the first mutual fund, and information associated with the first company. The system server may directly or indirectly identify the contextual information associated with the first user (e.g., the user's previous redemptions or other transaction history), the first mutual fund (or funds similar to the first mutual fund), and the first company (or companies similar to the first company) from the system database. The system server may parse and process all identified contextual information to determine previous responses of the first user (such as prior redemption activities) for the first mutual fund (or funds similar to the first mutual fund).

The system server may execute a computer model, using the identified contextual information as an input, to generate a priority score corresponding to the likelihood. The priority score may be based in part on the previous user responses (or the similar events), such as the extent to which the user has redeemed assets in a previous time period, the amount of redemption in a previous time period, or the rate of redemption in a previous time period. In some embodiments, the system server may execute one or more scoring algorithms to generate the priority score corresponding to the likelihood (or the similar events) based on the identified contextual information. The scoring algorithms may be computer files, which may be stored in the system database. The system server may store the priority score corresponding to the likelihood (or the similar events) in the record associated with the user in the system database. This priority score is compared to a threshold value to determine an action item.

In a next step 206, the system server may retrieve a threshold value from the system database. The systems server may compare the priority score corresponding to the event (or the similar events) with the threshold value. The system server may establish a first communication channel between a user computer operated by the user and an analyst computer operated by an analyst when the priority score satisfies the threshold value. The system server may select the first communication channel from multiple communication channels stored in the system database, based on results of the comparison of the priority score and the threshold value. The first communication channel may be a telephonic communication channel. The system server may initiate an outgoing telephone call, via the telephonic communication channel, to the user computer operated by the user.

In a next step 208, the system server may query the system database. The system database may include a group of analysts qualified to execute the outgoing call from the analyst computer. Each analyst may be qualified to execute to outgoing call, from the analyst computer, based upon information related to operation of an automated call delivery system and information regarding professional capabilities of respective analysts. The automated call delivery system may include a helpdesk software, such as, a queuing system or an interactive voice response system. The professional capabilities of each analyst may include prior experience of the analyst and availability of the analyst.

The system server may identify an appropriate analyst from the group of analysts stored in the system database to operate the analyst computer from which the outgoing telephone call is initiated to the user computer operated by the user. The identified analyst may be most suitable to communicate with the user regarding the investment funds of the user via the telephonic communication channel. The identified analyst may have prior working experience on the subject of the investment funds associated with the user and operational information associated with the telephonic communication channel. The identified analyst may be available to communicate with the user at a suitable date and time within the predetermined time period.

The system server may assign the identified analyst to the outgoing call. The system server may present information associated with the outgoing call on a graphical user interface of the analyst computer operated by the identified analyst. When the analyst may transmit a confirmation message from the graphical user interface, the system server may place and route the outgoing call. During the telephonic communication session between the analyst computer operated by the identified analyst and the user computer operated by the user, the system server may present information associated with the investment funds of the user on the graphical user interface of the analyst computer. The analyst may explain the benefits of continuing with the investment funds without redemption to the user.

In a next step 210, when the priority score does not satisfy the threshold value, the system server may query the system database using an input. The input may include information associated with the user and the event associated with the user. The system database may store communication messages and electronic messages. The communication messages and the electronic messages may be associated with multiple users and multiple events. The communication messages may include information associated with the communication between users and analysts with respect to various events. In response to the query, the system server may determine a set of prior communication messages associated with the user and/or the event (or a similar event). The system server may determine a set of prior electronic messages associated with the user and/or the event (or a similar event).

In a next step 212, the system server may process the set of prior communication messages and the set of prior electronic messages. The system server may determine insights from processing of information associated with the set of prior communication messages and the set of prior electronic messages. The system server may generate an electronic message using the analysis of the information contained within the insights. The electronic message may include text information. The text information may include a language indicative of a context of a portion of the set of prior communication messages and the set of prior electronic messages. The text information may include content associated with the benefits of continuing with the investment funds without redemption.

In a next step 214, the system server may directly or indirectly transmit the electronic message to the user computer. In one embodiment, the system server may directly transmit the electronic message to the user computer via an electronic email. In another embodiment, the system server may indirectly transmit the electronic message to the user computer. For instance, the system server may transmit the electronic message to the analyst computer along with instructions about the user. The analyst computer may process the instructions, and then transmit the electronic message to the user computer via the electronic mail. The electronic message may be displayed on the graphical user interface of the user computer.

Figure 3:
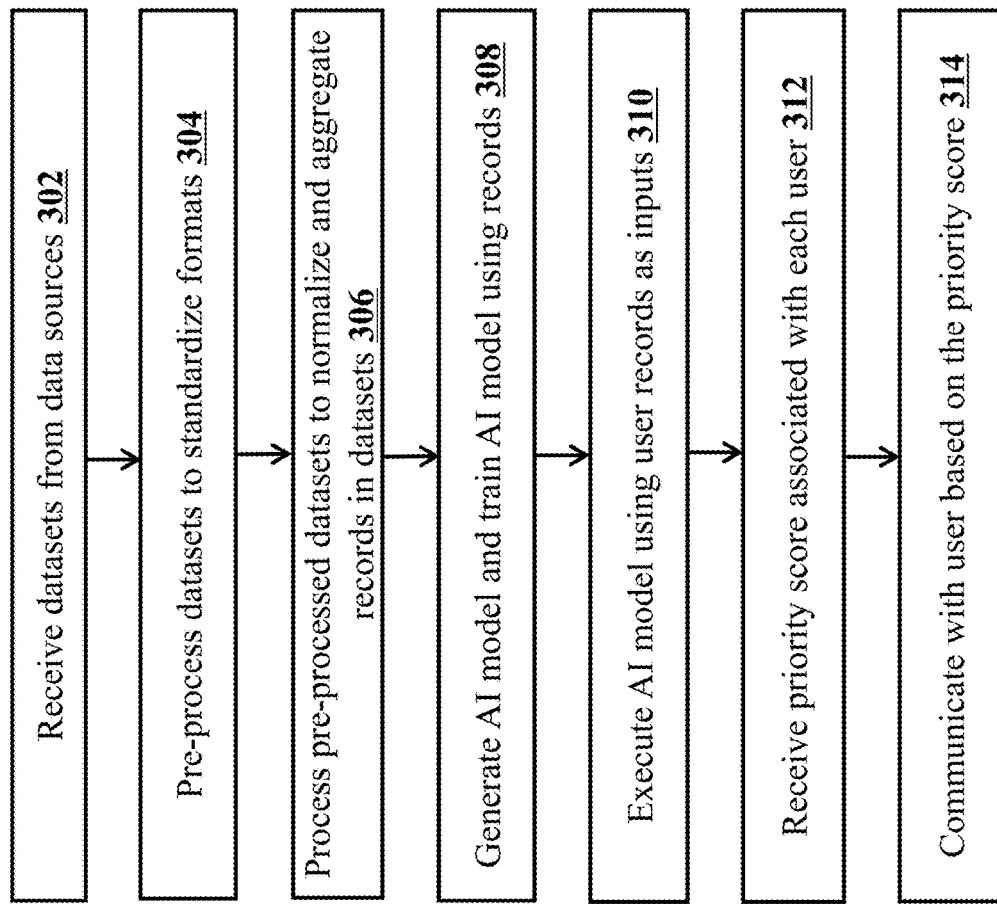
FIG. 3 shows execution of a method for establishing communication between analyst computers and user computers, according to an embodiment.

FIG. 3 shows execution of a method 300 for establishing communication between analyst computers and user computers. The method 300 shown in FIG. 3 comprises execution steps 302, 304, 306, 308, 310, 312, and 314. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of FIG. 3 is described as being executed by a single server computer in this embodiment. However, in some embodiments, steps may be executed by multiple computing devices operating in a distributed computing environment. In some cases, a computer executing one or more steps may be programmed to execute various other, unrelated features, where such computer does not need to be operating strictly as a system server described herein.

In a first step 302, the system server may receive datasets from data sources. The system server may retrieve the datasets from the data sources. The data sources may include, but not limited to, multiple application servers and data generation devices, which are configured to generate multiple data records associated with each dataset. The data sources may include, but not limited to, multiple data repositories. Each data repository may store the data records associated with each dataset in an electronic format.

The system server may store the datasets received from the data sources in a system database. The datasets may include, but not limited to, securities datasets, equities datasets, bonds datasets, futures datasets, mutual funds datasets, derivatives datasets, currencies datasets, commodities datasets, insurance contracts datasets, mortgages datasets, investment contracts datasets, hedge funds datasets, high-yield debt datasets, foreign debt datasets, convertible debt datasets, real estate investment trusts datasets, etc.

In a next step 304, the system server may retrieve the datasets from the system database. The datasets may be in original format as received from the data sources. The system server may pre-process the datasets to standardize the datasets into a common data format. Initially, the system server may determine a format of each data record associated with each dataset. The system server may then standardize all data records into a format compatible with a number of devices of the computer-based communication system. The system server may store pre-processed datasets in the system database.

In a next step 306, the system server may retrieve the pre-processed datasets from the system database. The pre-processed datasets may include different computational elements, for example, files, languages, macros, user-defined functions, and code. The system server may process the pre-processed datasets. The processing operation may result in normalizing and aggregating the data records in the pre-processed datasets. The system server may store normalized and aggregated datasets in the system database.

In a next step 308, the system server may generate an AI model, using logistic regression and gradient boosting tree. The system server may train the AI model using the normalized and aggregated datasets. The system server may continuously re-train the AI model using any new supply of normalized and aggregated datasets.

The AI model may include a neural network. The neural network may include an interconnected group of artificial neurons where each neuron may represent a redemption-related attribute. Non-limiting examples of the redemption-related attributes may include, but not limited to, a past financial history of the user operating the user computer, assets information of the user, current market value of the assets of the user, a number of transactions per month by the user, an amount of transactions of the user, and the like. The AI model may represent a mathematical model, which may include mathematical functions describing the relationship between each neuron within the neural network using weight and bias factors.

The execution of the AI model may generate a priority score for the user. The priority score may correspond to a probability of the user redeeming their investment funds. Using the priority score, the system server may be able to predict a redemption rate for each investment fund owned by the user. The AI model may identify which investment funds owned by the user may be at risk, and generate an action plan to address the risk.

In a next step 310, the system server may execute the AI model using the information associated with each user as an input to calculate the priority score for each user. The information may include, but not limited to, at least one transaction made by the user involving at least one investment fund, investment funds associated with the user, and user characteristics. The investment funds may include, but not limited to, securities, equities, bonds, futures, mutual funds, derivatives, currencies, commodities, insurance contracts, mortgages, investment contracts, hedge funds, high-yield debt, foreign debt, convertible debt, notes, real estate investment trusts, etc. The user characteristics may include, but not limited to, financial history of the user, prior redemption data of the user, current investment of the user, social media history of the user, buying and selling activity of the user, historical consistency at picking entry and exit points, and a number of buying or selling decisions made by the user.

In a next step 312, the system server may receive the priority score associated with each user from the AI model. The priority score may be indicative of a performance of each user relative to other users. The priority score may be a measure of a predictive nature of trading decisions of each user. The system server may use the priority score of each user to produce a ranked list of users. The system server may use information in the user profile record associated with each user along with the priority score of each user to produce the ranked list of users. The system server may store the ranked list of the users in the system database.

In a next step 314, the system server may establish communication with the user computer of each user based on the priority score and the rank of the user. Initially, the system server may select a communication channel from multiple communication channels for each user based on the priority score and the rank of the user. The system server may then establish communication with the user computer of each user via a selected communication channel.

The system server may evaluate all users based on the priority score and the rank of each user. The system server may determine a first subset of users with highest priority scores to be most likely to redeem on their investment funds. Based on the highest priority score, the system server may select an online video communication channel for the first subset of users. The system server may establish the online video communication channel between user computers of the first subset of users and analyst computers. The online video communication channel may include video as well as audio communication between each of the first subset of users and each analyst. During the communication, the analyst operating the analyst computer may communicate benefits of continuing with their investment funds without redemption to the first user operating the user computer.

The system server may determine a second subset of users with next highest priority scores to be less likely than the first subset of users to redeem on their investment funds. Based on the priority score, the system server may select an online voice communication channel for the second subset of users. The system server may establish the online voice communication channel between the user computers of the second subset of users and the analyst computers. The online voice communication channel may include audio communication between each of the second subset of users and each analyst. During the communication, the analyst operating the analyst computer may communicate benefits of continuing with their investment funds without redemption to the second user operating the user computer.

The system server may determine a third subset of users with lowest priority scores to be least likely to redeem on their investment funds. Based on the priority score, the system server may select a message communication channel between user computers of the third subset of users and the analyst computers. The system server may establish wireless connection between the user computers of the third subset of users and the analyst computers. The message communication channel may include transmission of electronic messages. The electronic messages may include information associated with the benefits of continuing with investment funds without redemption.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
executing, by a computer, an artificial intelligence model configured to identify a priority score corresponding to a likelihood that a user will redeem an asset within a time period at an amount higher than a previous time period, wherein the artificial intelligence model has been trained using a training dataset comprising data indicative of effect of an intervention on a redemption rate of a set of historical users;
when the priority score satisfies a threshold value, initiating, by the computer, a call to the user; and
when the priority score does not satisfy the threshold value, transmitting, by the computer, an electronic message to the user.

2. The method of claim 1, wherein the artificial intelligence model further predicts a second time period for the intervention associated with the user.

3. The method of claim 1, wherein the artificial intelligence model executes a classifier to predict whether the user is associated with the intervention or a non-intervention.

4. The method of claim 1, further comprising:
re-training, by the computer, the artificial intelligence model in accordance with a known false positive priority score.

5. The method of claim 1, further comprising:
assigning, by the computer, an analyst from a database to the call.

6. The method of claim 5, wherein the analyst is selected from a group of analysts qualified to execute the call based at least in part on the priority score, information related to the user, attributes of the analyst, and operation of an automated call delivery system.

7. The method of claim 5, further comprising:
presenting, by the computer, instructions for the call on a user interface of an analyst computer of the analyst.

8. The method of claim 1, wherein initiating, by the computer, the call corresponds to routing, by the computer, the call from the user to an analyst.

9. The method of claim 5, wherein the analyst is selected based at least in part on an availability of the analyst to execute the call.

10. The method of claim 1, wherein the electronic message comprises text based on processing of at least one previous communication message of the user.

11. A system comprising:
a computer-readable medium having a set of non-transitory instructions, that when executed, cause a processor to:
execute an artificial intelligence model configured to identify a priority score corresponding to a likelihood that a user will redeem an asset within a time period at an amount higher than a previous time period, wherein the artificial intelligence model has been trained using a training dataset comprising data indicative of effect of an intervention on a redemption rate of a set of historical users;
when the priority score satisfies a threshold value, initiate a call to the user; and
when the priority score does not satisfy the threshold value, transmit an electronic message to the user.

12. The system of claim 11, wherein the artificial intelligence model further predicts a second time period for the intervention associated with the user.

13. The system of claim 11, wherein the artificial intelligence model executes a classifier to predict whether the user is associated with the intervention or a non-intervention.

14. The system of claim 11, wherein the set of instructions further cause the processor to:
re-train the artificial intelligence model in accordance with a known false positive priority score.

15. The system of claim 11, wherein the set of instructions further cause the processor to:
assign an analyst from a database to the call.

16. The system of claim 15, wherein the analyst is selected from a group of analysts qualified to execute the call based at least in part on the priority score, information related to the user, attributes of the analyst, and operation of an automated call delivery system.

17. The system of claim 15, wherein the set of instructions further cause the processor to:
present instructions for the call on a user interface of an analyst computer of the analyst.

18. The system of claim 11, wherein initiating the call corresponds to routing the call from the user to an analyst.

19. The system of claim 15, wherein the analyst is selected based at least in part on an availability of the analyst to execute the call.

20. The system of claim 11, wherein the electronic message comprises text based on processing of at least one previous communication message of the user.

* * * * *